(12) United States Patent
Wang et al.

(10) Patent No.: US 12,513,169 B1
(45) Date of Patent: Dec. 30, 2025

(54) COMBINING MULTIPLE DETECTION ALGORITHMS INTO A CONFIDENCE SCORE FOR BOT DETECTION

(71) Applicant: Akamai Technologies, Inc., Cambridge, MA (US)

(72) Inventors: Zixu Wang, Saratoga, CA (US); Tyson J. Thomas, San Francisco, CA (US); Sreenath Kurupati, Saratoga, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 304 days.

(21) Appl. No.: 17/675,090

(22) Filed: Feb. 18, 2022

Related U.S. Application Data

(60) Provisional application No. 63/213,338, filed on Jun. 22, 2021.

(51) Int. Cl.
  H04L 9/40 (2022.01)
(52) U.S. Cl.
  CPC ...... H04L 63/1425 (2013.01); H04L 63/1416 (2013.01); H04L 63/1458 (2013.01); H04L 63/166 (2013.01); H04L 63/20 (2013.01)
(58) Field of Classification Search
  None
  See application file for complete search history.

(56) References Cited

U.S. PATENT DOCUMENTS

| | | | |
|---|---|---|---|
| 9,430,646 B1* | 8/2016 | Mushtaq | H04L 67/02 |
| 10,122,748 B1* | 11/2018 | Currie | H04L 63/1433 |
| 10,735,468 B1* | 8/2020 | Viljoen | H04L 63/145 |
| 11,374,945 B1* | 6/2022 | Senecal | H04L 63/1416 |
| 2015/0264061 A1* | 9/2015 | Ibatullin | H04L 63/145 726/23 |
| 2016/0241581 A1* | 8/2016 | Watters | G06F 21/552 |
| 2021/0037048 A1* | 2/2021 | Kurupati | G06N 3/082 |
| 2022/0131895 A1* | 4/2022 | Ho | G06Q 30/0222 |

* cited by examiner

*Primary Examiner* — Atta Khan
(74) *Attorney, Agent, or Firm* — David H. Judson

(57) ABSTRACT

A bot detection service associated with an overlay network operates to score traffic as a probability of being a bot, as opposed to returning a binary classification (i.e., bot or human). According to the approach herein, scoring is determined through probability estimates, wherein a score (the probability) is based on considering a set of detections concurrently. In one embodiment, all (or substantially all) triggered (current) threat detections contribute to the score. The preferred approach penalizes requests that fail all (or substantially all) combinations of detection algorithms. According to a further feature, an automated tuning (auto-tuning) is also applied, e.g., using real-time empirical statistical models, to adapt the measurement of false positive probability for one or more threat detection algorithms to suit customer traffic trends. The approach herein is also extensible to include any number of future threat detection algorithms.

17 Claims, 3 Drawing Sheets

COMBINING MULTIPLE DETECTION ALGORITHMS INTO A CONFIDENCE SCORE FOR BOT DETECTION

BACKGROUND

Technical Field

This application relates generally to protecting websites and mobile applications (apps) from automated attacks by scripts or bots.

Brief Description of the Related Art

Detection of automated attacks or bots is difficult because they are constantly evolving and adapting to bypass detection algorithms. Detections based upon telemetry are vulnerable to improved synthetic telemetry from bots. Detections based upon valid configuration estimates are compromised by legal variations of client characteristics.

A typical bot detection system reports a confidence score (e.g., from 0 to 100) to indicate whether an attempt is a bot or human, where the value 0 represents low bot threat and the value 100 represents maximum bot threat. To score an attempt, the system may examine different types of data from one or more threat categories (e.g., various behavioral detections on keyboard sensor data, mouse sensor data, device orientation and movement, etc.), typically in some order of precedence. While these approaches provide significant advantages and provide for robust bot detection, not all customers experience the same distribution of devices or exhibit the same levels of human false positive. Also, it would be desirable to provide scoring methods that allow for incorporation of new detections and to allow individual customers to have more flexibility in how their traffic is scored.

BRIEF SUMMARY

To this end, and instead of scoring requests as a binary class (bot or human), preferably a request is scored as a probability of being a bot. Preferably, scoring is determined through probability estimates, and in a preferred embodiment a score is based on considering a set of detections in parallel (as opposed to some order of precedence). In one embodiment, all (or substantially all) triggered (current) threat detections contribute to the score. The preferred approach penalizes requests that fail all (or substantially all) combinations of detection algorithms. According to a further feature, an automated tuning (autotuning) is also applied, e.g., using real-time empirical statistical models, to adapt the measurement of false positive probability for one or more threat detection algorithms to suit customer traffic trends. The approach herein is also extensible to include any number of future threat detection algorithms.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

The following provides a description of an operating environment in which the techniques of this disclosure may be practiced. This operating environment is not intended to be limiting.

Figure 1:
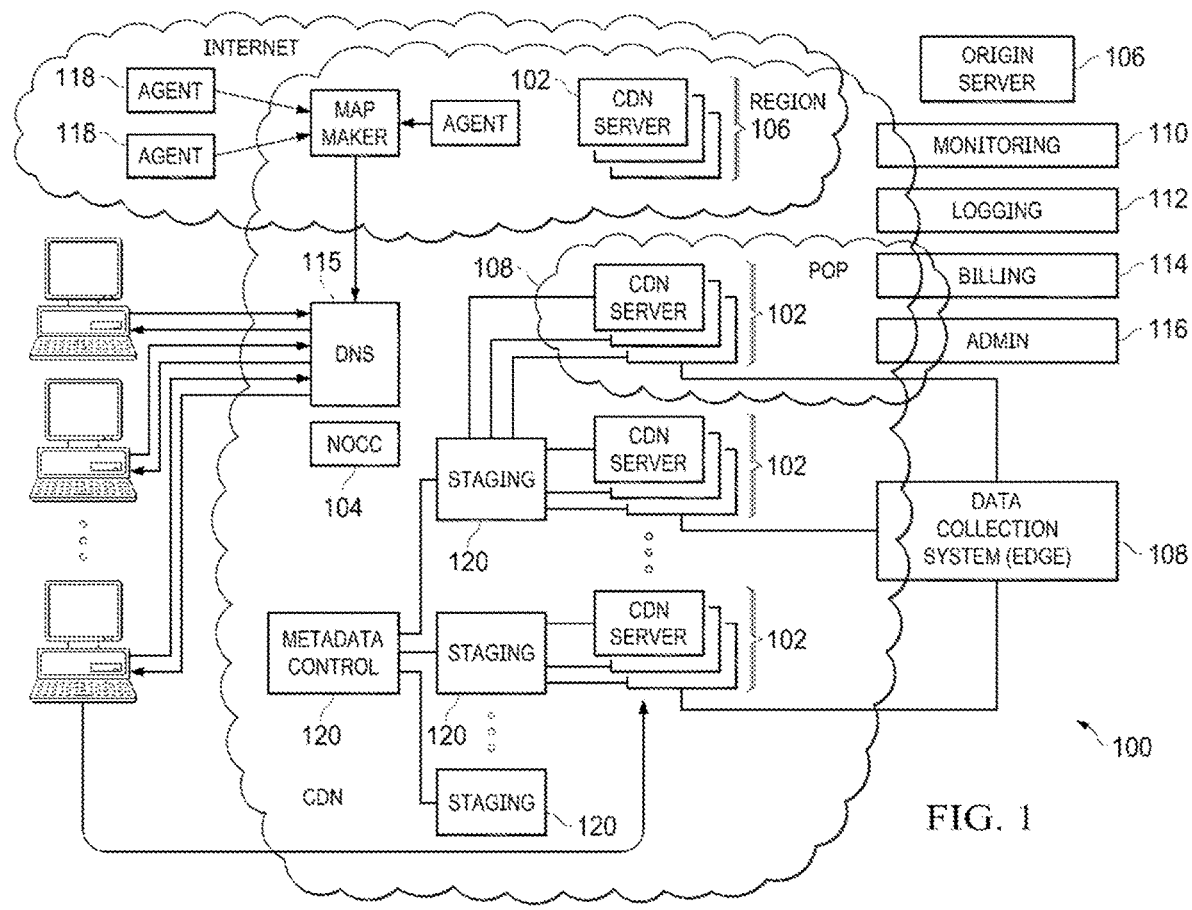
FIG. 1 is a distributed computer system in which the techniques of this disclosure may be practiced.

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or subdomains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
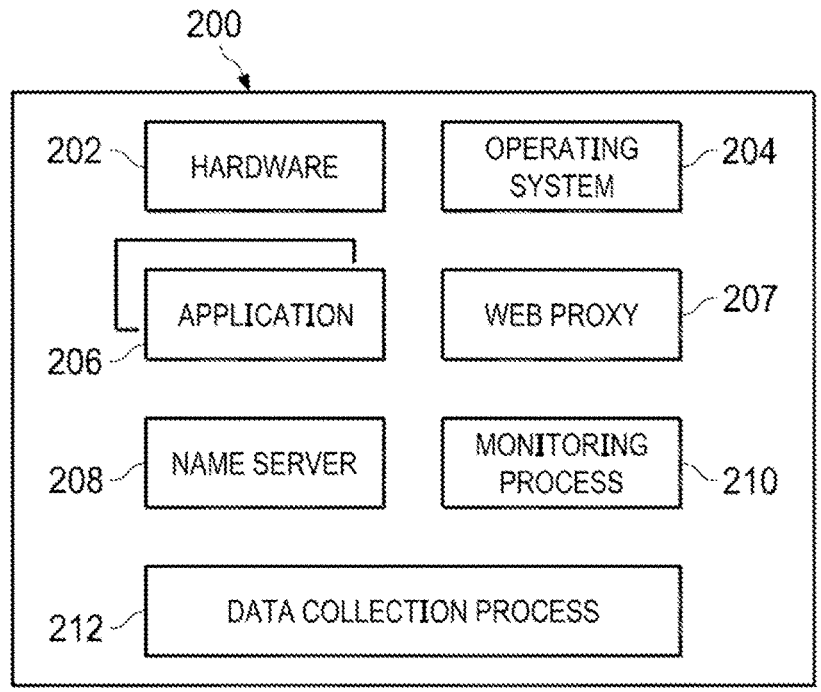
FIG. 2 is a machine that supports and executes an edge server at which the bot detection of this disclosure may be initiated.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Thus, and as used herein, an "edge server" refers to a CDN (overlay network) edge machine. For a given customer, the CDN service provider may allow a TCP connection to originate from a client (e.g., an end user browser, or mobile app) and connect to an edge machine representing the customer on a virtual IP address (VIP) assigned to the customer, or a general VIP that allows for discovery of the intended customer. For purposes of this disclosure, it is assumed that this edge machine does not have the customer's private key or the customer's certificate.

Figure 3:
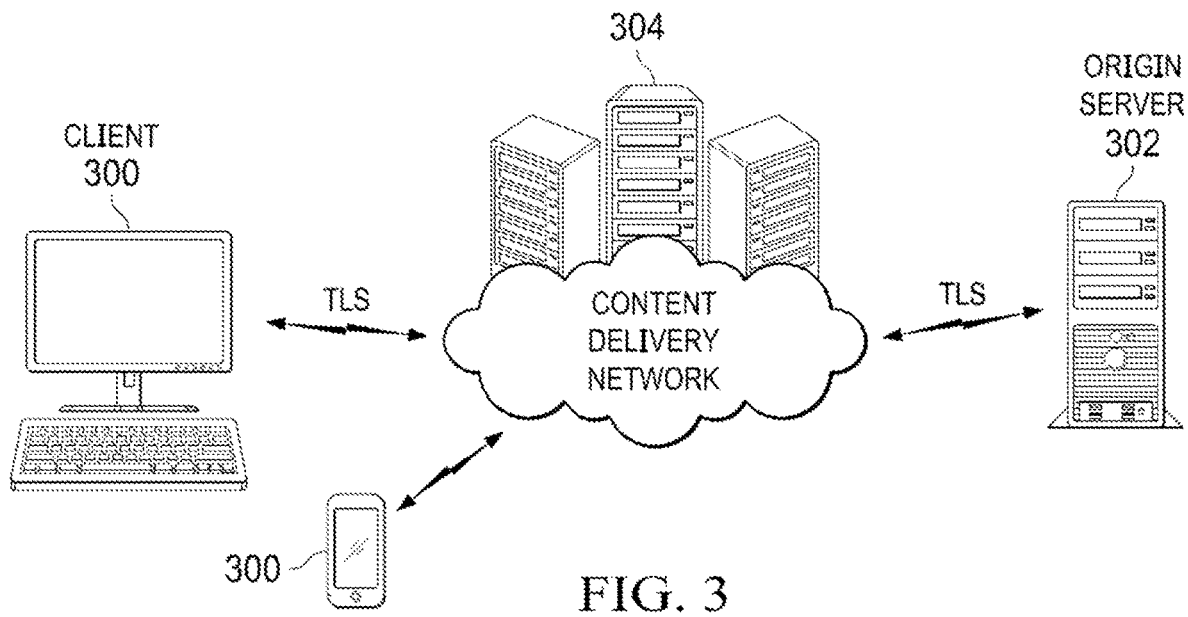
FIG. 3 depicts a typical end user interaction with an edge server of a content delivery network (CDN), the CDN providing accelerated delivery of content published by a content provider.

As illustrated in FIG. 3, in the typical interaction scenario, an end user client browser or mobile app 300 is associated with a customer origin server (or "origin") 302 via the intermediary of an overlay network edge machine server instance 304 (sometimes referred to as an "edge server"). The terms "origin" or "edge" are not intended to be limiting.

As further background, HTTP requests are expected to come with certain headers, for example the Host header, which may indicate which web server is being addressed, or the User-agent, which identifies what type of system (browser, device) is making the request so that the web server hosting the content can response with content adapted to the system that requests it. Different browsers (Edge, Firefox, Safari, Chrome, Opera) send more or less the same set of headers, but the order in which headers are sent varies from one browser to the next or the HTTP protocol version. The header sent also depends on the method of the (POST vs. GET). and the type (XHR request vs. text/html requests). The order of the HTTP header and the protocol version constitutes a header fingerprint.

It is known to perform client request anomaly detection by evaluating a request header signature and looking for anomalies typically seen with bots. If the total anomaly score reaches a predefined threshold, an action rule will trigger. Some of these rules are designed to evaluate the header order of requests coming from client claiming to be Firefox, Chrome, Opera, Safari, Internet Explorer or Microsoft Edge.

Basic bots and botnets can be detected relatively easily using such detection techniques. These more simplistic bots usually give themselves away because there are enough anomalies in the header signature, or their behavior is atypical of a regular user. That said, the system may produce false negatives with respect to highly distributed botnets that "hide" behind a proxy, send request at a low rate, or perhaps have little to no anomalies in their header signatures. To detect these more sophisticated botnets, sometimes running on a headless browser (e.g., CasperJS, PhantomJS, Selenium, NodeJS), more advanced detection techniques may be used. JavaScript injection techniques are widely used in the industry to help detect these more advanced botnets. In particular, a bot that shows little anomalies in the header signature and behaves "like a regular user" may actually not fully support JavaScript. For a bot that fully supports JavaScript, it is desirable to inject code that helps collect specific characteristics (a fingerprint) of the client that when evaluated, helps detect them.

Bot detection using information collected through JavaScript (JS) may proceed as follows. At step (1), the JS is dynamically injected at the edge on the relevant pages (text/html). At step (2), the client loads the JS, executes it, and sends the data collected asynchronously. At step (3), the edge server intercepts and evaluates the JS fingerprint, looking for specific anomalies typically seen when coming from an automated system (script or bot, etc.). At step (4), each anomaly is given a score and, if the fingerprint total anomaly score goes beyond a certain threshold, the client is classified as a bot. The result of the fingerprint evaluation is recorded in a session cookie and evaluated with each subsequent request.

Figure 4:
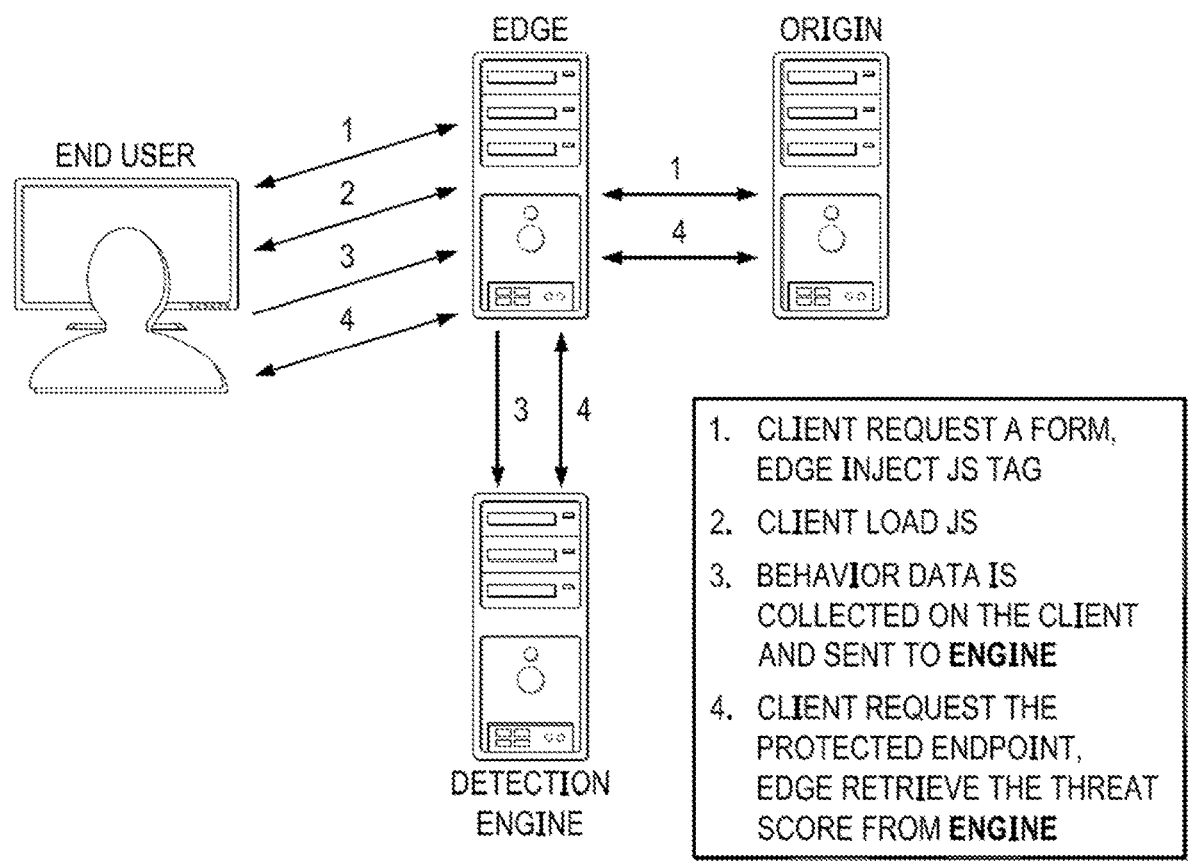
FIG. 4 depicts a bot detection service operating in association with the CDN.

Thus, and as depicted in FIG. 4, JavaScript-based technology collects a lightweight fingerprint and other behavioral data from the client. The data is collected asynchronously and sent to a bot detection engine. On a protected request (e.g., TLS-secured POST login), the edge server obtains the client classification from the bot detection engine and applies it on the edge.

Several methods may be used to detect bots using the fingerprint include, without limitation, anomaly detection, dynamic rate limiting, and blacklisting.

Anomaly detection is based on the principle that good browsers (such as Chrome, Firefox, Safari, and the like) have a few valid combinations of given fingerprints for each browser version. The "known" or "correct" combinations are learned a-priori. This can be done by analyzing prior human traffic and building a table of valid combinations (user agent and associated fingerprint possibilities). A bot script masquerading its user-agent as one of the well-known browsers is then caught by checking for the existence of the user-agent and the given fingerprint in the "known/correct" table.

Dynamic rate limiting is based on the principle that the system keeps tracks of the received fingerprints and then rate limits given fingerprints. Bot Attacks can be blocked in this way, as the given fingerprint will rapidly exceed the allowed rate threshold.

Blacklisting is based on the principle that the fingerprints of malicious bot tools can be collected and stored in a database/file (also known as a blacklist file). When a fingerprint is part of this blacklist file, it is then blocked.

All of the above techniques can be modulated with other signals to produce higher accuracy.

It is also known to integrate the above-described scripting-based technology into a CDN service to protect web applications. Formally, the following glossary defines various terms used below to describe different elements of the architecture and the design:

- fingerprint: data (a data set) collected by a JavaScript or SDK running on a client; the fingerprint typically comprises one or more characteristics of the machine and web browser, such as the screen size, browser version, font supported, browser plugins installed;
- telemetry: data recording user behavior, such as (without limitation) mouse movement, gyroscope data, keystrokes, touch screen interaction;
- sensor data: a collection of the fingerprint and the telemetry being sent by the client machine;
- bot detection service: a computing infrastructure (machines, devices, appliances, software, database, data, etc.) that evaluates the sensor data;
- bot detection service cluster: a set of servers, e.g., running a bot detection engine, and that evaluate the sensor data for a given CDN customer;
- bot detection service API: an Application Programming Interface (API) that receives the sensor data and allows an edge server (or other permitted requesting entity) to retrieve a threat score, e.g., by issuing a Get Threat Score (GTS) request;
- threat score: a client classification (bot or human) returned by the bot detection service based on the evaluation of the sensor data;
- autopost: a JSON-formatted POST request that is generated by the bot detection service JavaScript on the client side and that carries the sensor data;
- user behavior analysis: the process of collecting fingerprint and telemetry from the client to evaluate the behavior of the user to classify it as a human or bot;
- credential abuse: a type of web attack that typically comprises replaying a known list of valid credentials (username+password) against various web sites in an attempt to take over the account;
- gift card abuse: a type of web attack that consist in guessing the PIN code associated with a gift card through a brute force attack;
- scraper reputation: the reputation of an IP address (IP) in a client reputation "scrapper" category;
- base page: a main HTML page that hosts the code for the main structure, content of the page and that typically references additional objects such as JavaScript, style sheets, images; and
- protected resource/endpoint/API: a web resource/URL to be protected.

The integration of a JavaScript-based bot detection service technology into an overlay network (e.g., CDN) ecosystem is also known. The overlay network platform may have its own bot management detection framework, as generally described above. As also described above, an overlay platform comprises a set of distributed technologies that are accessible, e.g., via a customer configuration portal. As described herein, the JavaScript technology is integrated into the overlay network framework, preferably as a new detection method. The user, when interacting with the portal, sees new detection methods available in the bot manager detection configuration application and may be requested to specify an endpoint to be protected. For convenience of explanation only, the focus for this detection method is the transactional use case such as account login, account creation, checkout flow, customer loyalty reward programs and finally flight, room or event ticket search workflow. These use cases are not intended to be limiting.

Bots may be detected using empirical data models and real-time clustering of field value patterns. One such approach leverages the notion that bot traffic is statistically anomalous compared to empirical models of human traffic. In particular, bots have more similar and repeating network patterns (i.e., lists of field values) that lend themselves to tighter clustering than random human traffic.

Bot detection may leverage a clustering algorithm for "Get Threat Score" (GTS) requests that are issued to the bot detection service. The algorithm is designed to detect bots, e.g., using valid device anomaly (DAN) patterns. A DAN pattern is typically a hash. Patterns may be categorized as basis pattern, and combination pattern. A basis pattern typically is a certain characteristic of a request/device/browser/OS that has cardinality, and that is sent along with an autopost request to the bot detection service. A combination pattern are combinations (concatenations) of basis patterns, such as DAN #(e.g., canvas fingerprint, certain browser parameters, display dimensions, user agent, TLS hash, header order, TCP, H2 hash, font hash, web FL, etc.). Patterns (i.e., sensor data) are collected by JavaScript (JS) at the client, calculated by an edge server, or even part of the HTTP request. As noted, there are patterns specific to web and mobile traffic, and some patterns are common to both kinds of requests.

In an example embodiment, assume that the bot detection system reports a confidence score from 0 to 100 to indicate whether an attempt is a bot or human, where 0 represents low bot threat and 100 represents maximum bot threat. To score an attempt, one scoring approach relies on the expected threat false positive and a ground truth percentage of, e.g., DAN #patterns, to derive whether the occurrence of a threat is treated as a bot or human.

By way of further background, the following describes a confidence scoring technique. Typically, there are several threat categories, e.g., replay (is the sensor data a replay of prior sensor data), empty sensor data or ESD (does the autopost have no sensor data or have a parse error), key (various behavioral detections on key sensor data), mouse (various behavioral detections on mouse sensor data), device orientation and motion (various behavioral detections on orientation and motion sensor data), DAN (whether the attempt failed DAN #), TLS (whether the attempt has an invalid TLS hash), other (other behavioral detections such as browser integrity, etc.). Preferably, each threat category is associated with a detection algorithm (a "detection"), and typically the detection(s) differ from one another. The following assumptions and truths are then defined: P (Detection|Human) represents the false positive rate of a detection, where a detection is associated with a particular threat category. So, e.g., Detection 1 corresponds to replay, Detection 2 corresponds to ESD, Detection 3 corresponds to key, etc. P (Detection|Bot)=1, and P (Human)=a value close to 1, as most users are human when the customer is not under attack. P (Bot)=a value close to 0, as a rare number of attempts are a bot when customer is not under attack. P (Bot) increases when the customer is under attack. This value is estimated, e.g., by observing bots in a given sample time window. As noted, the false positive (FP) rate, fp_rate (e.g., represented as a percentage value) preferably is calculated for each of the threat categories, preferably periodically. This FP rate calculation generates an autotuning data set comprising, e.g., a set of probabilities (e.g., P (replay|human)=% value, P (ESD|human)=% value, P (key|human)=% value, etc. Preferably, the data set (per detection) includes an indicator whether the detection is enabled or disabled, a false positive percent/threshold for the particular detection, a minimum threshold (preferably attempts only get a score greater than 0 as they pass this minimum threshold), and whether autotuning is enabled for the detection.

In one embodiment, and according to this disclosure, the bot score is then computed as a composite probability estimate P (Detection 1, Detection 2, . . . ), where:

P (Bot|Detection 1, Detection 2, . . . )=[P (Bot)*P (Detection 1, Detection 2, . . . |Bot)]/[P (Detection 1, Detection 2, . . . )], where P (Detection 1, Detection 2, . . . =P (Detection 1, Detection 2, . . . |Bot)*P (Bot)+P (Detection 1, Detection 2, . . . | Human)*P (Human).

As noted above, data collection typically is based on autoposts (e.g., HTTPS POSTS issued from clients provisioned to execute data collection scripts), and the GTS response typically is a lowest score of the autoposts in a session. As noted above, the scoring algorithm generates a score being a value between 0 and 1 representing a probability that an autopost is a bot given the threat category data present (preferably all of them) in the collected data, together with the false positive probability estimates. As noted above, a false positive rate preferably is calculated for each threat category. This rate serves as thresholding in confidence scoring. In addition to considering the detections in parallel (as reflected in the composite probability estimate), preferably the scoring herein implements automated tuning that changes customer settings automatically based on the customer's traffic. The purpose is to adjust threshold settings for one or more detections used in confidence scoring. The following provides additional details regarding the automated tuning.

In particular, and in a preferred embodiment, a traffic estimation function estimates the expected human autoposts at any given time period (e.g., minute). In one embodiment, the function uses a set of one or more DAN patterns to extract the estimate for real-time traffic. Median filtering for all the patterns' estimate is then used to determine a total estimate. The traffic estimation function provides a real-time value of human autoposts. This value varies across customers and, according to this disclosure, preferably the value is then used to facilitate per-customer threshold adjustments for one or more detections (threat category detection algorithms). Autotuning the confidence score preferably measures false positive rate of all threat categories over a time period by counting the number of times a detection fires and normalizing by the total human request volume to determine the false positive rate. The false positive rates are then updated based on the measurements. As one example, the following algorithm may be used.

In particular, and on a customer and given time period basis, collect the total count of a set of one or more DAN #patterns. Also, collect the count of each of the threat category detections. Divide the total count of each pattern by the respective DAN #percentage to get an individual traffic estimate for each DAN #pattern. If the individual traffic estimate is an outlier, it may be ignored. For the remaining DAN #patterns, collect individual autotuning (fp_rate) for all detections. Then, and across all the detections, determine an autotuning fp_rate for each detection. By removing outlier DAN #, autotuning is not affected by sudden spikes in traffic volume that often are related to attacks. Therefore, the false positive rate calculated by autotuning is an accurate measure of the percentages of detections found in a sample of human users. Other ways to eliminate biases from false positive rate calculations include using a subnet reputation where such reputation can determine if data is an outlier and remove such data entries from the autotuning calculations.

The confidence scoring technique herein has significant advantages. Instead of scoring requests as a binary class (bot or human), a request is scored as the probability of being a bot. Preferably, the scoring method is determined through statistical methods and uses all (or substantially all) current threat detections as contributors to the score. By considering preferably all (or substantially all) detections in parallel, the detection sensitivity is enhanced. Further, the approach is readily extensible to include any number of future threat detection algorithms. Autotuning further supplements confidence scoring by increasing sensitivity and serviceability, in particular by automatically calculating per customer detection false positive rates. In this manner, autotuning avoids manual setting of detection thresholds. Autotuning also allows a much quicker manner to adjust to time period-based variables which allows the accuracy of scoring bots to respond quicker to changes in trend (i.e., daytime, nighttime traffic cycles, or sales events etc.). Finally, autotuning optionally facilitates the automatic deactivation of high false positive rate detections on a per customer basis, which provides a failsafe design that allows more aggressive global rollout of new detection algorithms while lowering the risk of system false positives.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

The techniques herein may be implemented in a computing platform, such as variously depicted in FIGS. 1-2, although other implementations may be utilized as well. One or more functions of the computing platform may be implemented conveniently in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include Software as a Service (SaaS) (the provider's applications running on cloud infrastructure), Platform as a service (PaaS) (the customer deploys applications that may be created using provider tools onto the cloud infrastructure), and Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

Each above-described process, module or sub-module preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server. While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

What is claimed follows below.

The invention claimed is:

1. A method for detecting bots operative in a bot detection service associated with an overlay network, the overlay network comprising a server that receives request traffic, comprising:
  receiving telemetry from the server comprising values from a set of threat categories, wherein a given threat category has an associated detection algorithm;
  in response to a request, generating a score using probability estimates derived from parallel execution of detection algorithms for at least first and second threat categories of the set of threat categories;
  returning the score in response to the request, wherein the score indicates to the server whether the telemetry is indicative of a bot;
  determining a false positive rate for the threat category; and
  adjusting a threshold setting for at least one detection algorithm based on the determined false positive rate for the threat category;
  wherein a detection algorithm generates a Detection, P represents a probability, and the probability estimates derived from parallel execution of detection algorithms comprise a composite probability estimate P (Detection 1, Detection 2, . . . ), where:
  P (Bot|Detection 1, Detection 2, . . . )=[P (Bot)*P (Detection 1, Detection 2, . . . |Bot)]/[P (Detection 1, Detection 2, . . . )],
  where P (Detection 1, Detection 2, . . . =P (Detection 1, Detection 2, . . . |Bot)*P (Bot)+P (Detection 1, Detection 2, Human)*P (Human);
  where P (Bot) is a probability of occurrence of a bot in the request traffic;
  P (Human) is a probability of occurrence of a human in the request traffic;
  P (Bot|Detection 1, Detection 2, . . . ) is a probability of a user being a bot given the user triggering Detection1, Detection 2, . . . ;
  P (Detection 1, Detection 2, . . . |Bot) is a probability that a detection is triggered given that the user is a bot; and
  P (Detection 1, Detection 2, . . . |Human) is a probability that a detection is triggered given that the user is a human.

2. The method as described in claim 1 wherein parallel execution of detection algorithms to derive probability estimates comprises execution of the detection algorithms of all of the set of threat categories.

3. The method as described in claim 1 wherein the threshold setting is adjusted on a per customer basis with respect to a set of customers that use the overlay network for content delivery.

4. The method as described in claim 1 wherein the set of threat categories comprise at least one of: replay, empty sensor, keyboard, mouse, device orientation and motion, device anomaly (DAN) pattern, and TLS.

5. The method as described in claim 1 wherein the threshold setting is adjusted for each detection algorithm.

6. The method as described in claim 1 wherein the detection algorithms for the at least first and second threat categories of the set of threat categories differ from one another.

7. The method as described in claim 1 further including selectively adding a new detection algorithm and including an automated probability estimate derived from the new detection algorithm to generate the score.

8. The method as described in claim 1 wherein the adjusting the threshold setting autotunes the score.

9. The method as described in claim 1 wherein the false positive rate is a function of traffic associated with a given customer associated with the overlay network.

10. A method of bot detection operative in a bot detection service associated with an overlay network, the overlay network comprising a server that receives request traffic, comprising:
responsive to receipt of threat scoring requests from the server that are directed to the bot detection service, generating one or more scores based on probability estimates from multiple detections carried out in parallel using distinct detection algorithms, and wherein at least one score is a composite probability estimate; and
providing the server the one or more scores in response to threat scoring requests; and
taking one or more actions at the server based on the one or more scores;
wherein a detection algorithm generates a Detection, P represents a probability, and the probability estimates derived from multiple detections carried out in parallel using distinct detection algorithms comprise a composite probability estimate P (Detection 1, Detection 2, . . . ), where:
P (Bot|Detection 1, Detection 2, . . . )=[P (Bot)*P (Detection 1, Detection 2, . . . |Bot)]/[P (Detection 1, Detection 2, . . . )],
where P (Detection 1, Detection 2, . . . =P (Detection 1, Detection 2, . . . |Bot)*P (Bot)+P (Detection 1, Detection 2, Human)*P (Human);
where P (Bot) is a probability of occurrence of a bot in the request traffic;
P (Human) is a probability of occurrence of a human in the request traffic;
P (Bot|Detection 1, Detection 2, . . . ) is a probability of a user being a bot given the user triggering Detection1, Detection 2, . . . ;
P (Detection 1, Detection 2, . . . |Bot) is a probability that a detection is triggered given that the user is a bot; and
P (Detection 1, Detection 2, . . . |Human) is a probability that a detection is triggered given that the user is a human.

11. The method as described in claim 10, wherein the scores are generated on a per-customer basis with respect to a set of customers that use the overlay network for content delivery, the method further including adjusting per-customer detection thresholds based on the customer's traffic.

12. The method as described in claim 10 wherein the one or more actions include one of: a blocking action, a mitigation action, a notification action, and a logging action.

13. The method as described in claim 1 further including receiving telemetry from the server, the telemetry having been generated by clients issuing request traffic to the server.

14. An apparatus, comprising:
a hardware processor;
computer memory comprising computer program code executed by the hardware processor to associate a probability that given traffic received at a server is associated with a bot, the program code configured to:
receive from the server telemetry associated with a set of threat categories, wherein a given threat category has an associated detection algorithm;
parallel execute a set of different detection algorithms on the received telemetry to generate the probability, wherein the probability is computed as a composite probability estimate;
determine a false positive rate for the given threat category; and
selectively adjust at least one threshold associated with a given detection algorithm of the set of detection algorithms, wherein the threshold is adjusted based on the determined false positive rate for the given threat category associated to the given detection algorithm;
wherein a detection algorithm generates a Detection, P represents a probability, and the probability estimates derived from parallel execution of the set of different detection algorithms comprise the composite probability estimate P (Detection 1, Detection 2, . . . ), where:
P (Bot|Detection 1, Detection 2, . . . )=[P (Bot)*P (Detection 1, Detection 2, Bot)]/[P (Detection 1, Detection 2, . . . )],
where P (Detection 1, Detection 2, . . . =P (Detection 1, Detection 2, . . . | Bot)*P (Bot)+P (Detection 1, Detection 2, . . . |Human)*P (Human);
where P (Bot) is a probability of occurrence of a bot in the request traffic;
P (Human) is a probability of occurrence of a human in the request traffic;
P (Bot|Detection 1, Detection 2, . . . ) is a probability of a user being a bot given the user triggering Detection1, Detection 2, . . . ;
P (Detection 1, Detection 2, |Bot) is a probability that a detection is triggered given that the user is a bot; and
P (Detection 1, Detection 2, . . . |Human) is a probability that a detection is triggered given that the user is a human.

15. The apparatus as described in claim 14 wherein the program code is configured to return the probability to the server.

16. The apparatus as described in claim 14 wherein the program code configured to selectively adjust at least one threshold operates on a per-customer basis with respect to a set of customers that use an overlay network that provides content delivery.

17. The apparatus as described in claim 14 further including augmenting the set of detection algorithms to include an additional threat detection algorithm.

* * * * *